(12) United States Patent
Balcar

(10) Patent No.: US 9,027,744 B1
(45) Date of Patent: May 12, 2015

(54) CENTER LOADING ASSEMBLY FOR A CONVEYOR BELT

(71) Applicant: James E. Balcar, Hueytown, AL (US)

(72) Inventor: James E. Balcar, Hueytown, AL (US)

( * ) Notice: Subject to any disclaimer, the term of this patent is extended or adjusted under 35 U.S.C. 154(b) by 49 days.

(21) Appl. No.: 14/092,712

(22) Filed: Nov. 27, 2013

(51) Int. Cl.
 *B65G 15/18* (2006.01)
 *B65G 21/20* (2006.01)
 *B65G 15/08* (2006.01)

(52) U.S. Cl.
 CPC ..................................... *B65G 15/08* (2013.01)

(58) Field of Classification Search
 USPC ........... 198/806, 808, 809, 823, 836.1, 836.2, 198/837
 See application file for complete search history.

(56) References Cited

U.S. PATENT DOCUMENTS

| | | | | | |
|---|---|---|---|---|---|
| 2,488,980 | A | * | 11/1949 | Madeira | 414/373 |
| 2,798,591 | A | * | 7/1957 | Stamos | 198/827 |
| 3,300,023 | A | * | 1/1967 | Creutzmann et al. | 198/535 |
| 3,593,841 | A | * | 7/1971 | Leow | 198/806 |
| 4,917,232 | A | * | 4/1990 | Densmore | 198/830 |
| 5,048,669 | A | * | 9/1991 | Swinderman | 198/525 |
| 5,246,099 | A | * | 9/1993 | Genovese | 198/807 |
| 5,267,642 | A | * | 12/1993 | Gharpurey et al. | 198/836.1 |
| 5,458,230 | A | | 10/1995 | Balcar | |
| 6,431,348 | B2 | * | 8/2002 | Malmberg | 198/806 |
| 6,843,444 | B2 | * | 1/2005 | Wood | 242/534.1 |
| 7,497,325 | B2 | * | 3/2009 | Simoens et al. | 198/836.1 |
| 7,669,709 | B2 | * | 3/2010 | Hovsto et al. | 198/806 |
| 8,556,068 | B2 | * | 10/2013 | DeVries | 198/807 |

* cited by examiner

*Primary Examiner* — Douglas Hess
(74) *Attorney, Agent, or Firm* — Gerald M. Walsh; Leo Law Firm, LLC

(57) ABSTRACT

A center loading assembly for a conveyor belt having a carriage support attached to a belt conveyor main frame and having a carriage within the carriage support. The carriage has a center member with side members extending at an angle therefrom, each having an upward extension. The upward extensions have side rollers and conveyor belt covering skirts and keep the conveyor belt centered between the conveyor belt covering skirts. The carriage support has vertical bearings to support the carriage and side bearings to hold the carriage on the vertical bearings. The carriage and conveyor belt covering skirts follow a trough angle of the conveyor belt as the conveyor belt shifts. Material deposited onto the conveyor belt is deflected to the center portion of the conveyor belt by the conveyor belt covering skirts.

21 Claims, 5 Drawing Sheets

CENTER LOADING ASSEMBLY FOR A CONVEYOR BELT

FIELD OF THE INVENTION

This invention relates to belt conveyors and, more particularly, to a center loading assembly which centers a moving conveyor belt between conveyor belt covering skirts as the conveyor belt shifts laterally from side to side so that material is always loaded on a center portion of the conveyor belt.

BACKGROUND OF THE INVENTION

A belt conveyor for transporting aggregate material is generally a trough-type conveyor which may be loaded at the tail section of the conveyor and at any point along its length. Belt conveyors are provided with conveyor belt covering skirts which direct the material being loaded to a central portion of the conveyor belt. The conveyor belt tends to shift laterally from its centered position as it is driven by the drive pulleys on the idler pulleys. This lateral shifting leads to off-centered loading onto the conveyor belt. This occurs because the conveyor belt cover skirts are fixed and stationary. This lateral shifting is sufficient to expose the idler pulleys and the drive pulleys such that the material being loaded can miss the conveyor belt and foul these mechanisms in the conveyor. U.S. Pat. No. 5,458,230, which is incorporated herein by reference, discloses a system with a carriage having side loading skirts which is transversely shiftable in response to lateral shifting of a conveyor belt so that the loading skirts direct material to a central portion of the belt even if the belt shifts transversely. However, the carriage uses rollers provided with a V-shaped rolling surface which rolls on a V-shaped track. The lateral force that the conveyor belt imparts on the V-shaped roller creates friction to movement and frequent derailing of the carriage from the track. The roller and track arrangement also is frequently fouled with load material debris due to its open design. In order to allow for maximum loading of the conveyor belt, what is needed is a center loading assembly that is capable of operating in a circular path, to operate with a conveyor belt that is troughed up to 80 degrees.

SUMMARY OF THE INVENTION

The invention is a center loading assembly for a conveyor belt wherein the assembly has a carriage and a carriage support. The carriage support has a left side, a right side, a top, and a bottom and is attached to a belt conveyor main frame. The carriage is contained within the carriage support. The carriage has a center member with side members extending therefrom. The side members are, preferably, angled upwards from the center member towards the top of the support carriage. Each end of the side members has an upward extension, one near the left side and the other near the right side. The upward extensions have side rollers and conveyor belt covering skirts attached thereto. The carriage support has vertical bearings attached thereto to support the carriage as the carriage moves from the left side to the right side and vice versa. The carriage support also has side bearings attached thereto to hold the carriage in position on the vertical bearings. The carriage support has openings in the top through which the upward extensions extend.

Pivoting carriage support arms are attached to the conveyor belt covering skirt and to the belt conveyor main frame at a position on the main frame being at or above the top of the carriage support, or they are attached to the conveyor belt covering skirt and to the top of the carriage support. In an alternate embodiment the pivoting carriage support arms are attached to the conveyor belt covering skirt and to the belt conveyor main frame at a position on the main frame at or below the bottom of the carriage support. The pivoting carriage support arms are, preferably, automatically adjustable in length.

When the conveyor belt shifts to the left side the conveyor belt engages the side roller near the left side and moves the carriage to the left side. When the conveyor belt shifts to the right side the conveyor belt engages the side roller near the right side and moves the carriage to the right side. Consequently, the conveyor belt always remains centered between the conveyor belt covering skirts as the conveyor belt moves from the right side to the left side and vice versa.

When material is deposited from a fixed discharge position spaced above a center portion of the conveyor belt, the material will be deposited onto the center portion, as the conveyor belt shifts to the left side or to the right side. The deposition of the material onto the center portion is produced by the material being deflected to the center portion by the conveyor belt covering skirts. Consequently, as a belt loading mechanism discharges material from a fixed point onto the conveyor belt, any shifting of the conveyor belt will be tracked by the movable covering skirts so that the material is deflected by the covering skirts to the center portion of conveyor belt. The material is, thus, always loaded on a center portion of the conveyor belt. Accordingly, the material to be loaded is not discharged on the conveyor belt at an off-center location that tends to cause spillage throughout the length of the conveyor belt. This tracking action by the movable covering skirts prevents costly clean-up problems, damage to the conveyor belt, and motor failure.

An advantage of the present invention is a carriage that is angled to match the trough angle of the conveyor belt.

Another advantage is a carriage that moves in a circular or linear path depending upon the design selected to match the conveyor belt trough angle, wherein the carriage and conveyor belt covering skirts follow the trough angle of the conveyor belt as the conveyor belt shifts.

Another advantage is a carriage that moves across vertical bearings that are connected to the carriage support, wherein the carriage support prevents debris from falling onto the vertical bearings.

Another advantage are side bearings that 1) are connected to the carriage support to hold the carriage on the vertical bearings, 2) counter the force imparted by the conveyor belt on the carriage, allowing the carriage to move freely, and 3) are angled to match the trough angle of the conveyor belt.

Another advantage is a carriage support which protects the carriage from derailing and from damage during transport and which prevents debris from falling onto the vertical and side bearings.

Another advantage is less friction for carriage movement provided by the vertical and side bearings.

DETAILED DESCRIPTION OF THE INVENTION

While the following description details the preferred embodiments of the present invention, it is to be understood that the invention is not limited in its application to the details of construction and arrangement of the parts illustrated in the accompanying figures, since the invention is capable of other embodiments and of being practiced in various ways.

Figure 1:
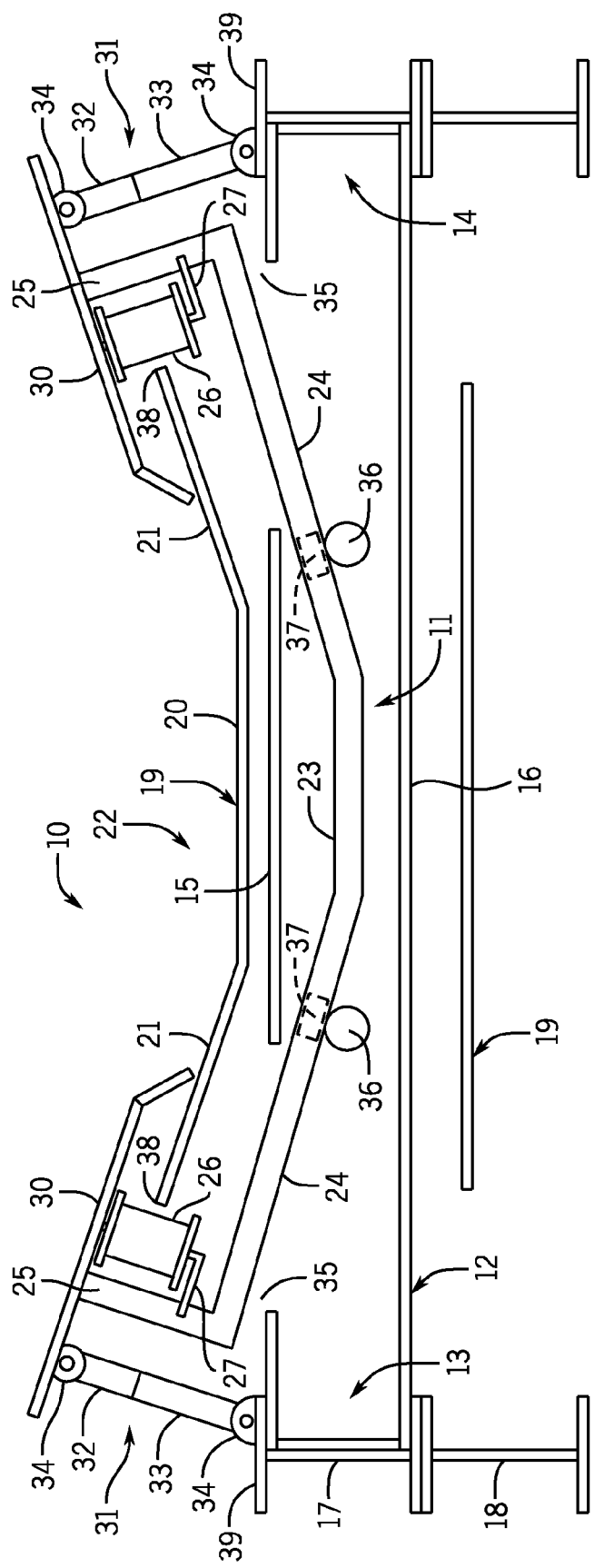
FIG. 1 shows a front sectional view of the center loading assembly of the present invention consisting of a carriage and a carriage support.

FIG. 1 shows a front sectional view of the center loading assembly 10 of the present invention that consists of a carriage 11 and a carriage support 12. The carriage support 12 has a left side 13, a right side 14, a top 15, and a bottom 16. The carriage support 12 is attached to a belt conveyor main frame 17 which is supported on legs 18. The carriage support 12 is made of hollow tubular material. A conveyor belt 19 is shown positioned above and below the carriage support 12. The conveyor belt 19 has a center portion 20 with side portions 21 which extend upward from the center portion 20 to form a trough 22 when the conveyor moves over trough-forming rollers or bearings (not shown). The carriage 11 is made of a frame, preferably rectangular tubing, having a center member 23 and side members 24 extending from the center member 23. The side members 24 are, preferably, angled upward from the center member 23 toward the top 15 but can have an angle ranging from 0 to 80 degrees. The side members 24 extend upward and out of the carriage support 12 through slots 35 in the top 15 of the carriage support 12. Each end of the side members 24 has an upward extension 25 which extends out of the carriage support 12 through slots 35. The extensions 25 have a conveyor belt covering skirt 30 attached thereto at their free ends. A conveyor belt side roller 26 is attached at one end to the upward extension 25 by means of a side roller support 27 and at the other end to the conveyor belt covering skirt 30. Edges 38 of conveyor belt 19 engage the side roller 26 if the conveyor belt 19 shifts left or right from center (see FIGS. 2 and 3). A pivoting carriage support arm 31 is attached rotatably to each conveyor belt covering skirt 30 and rotatably to the top 15 of the carriage support 12 and/or to the top 39 of main frame 17. The carriage support arms 31 may be constructed of a first member 32 engaging a second member 33 so that the carriage support arms 31 are automatically adjustable in length. Vertical bearings 36 and side bearings 37 are attached to the carriage support 12. The left and right side members 24 ride on vertical bearings 36 and are held in place by side bearings 37.

Figure 2:
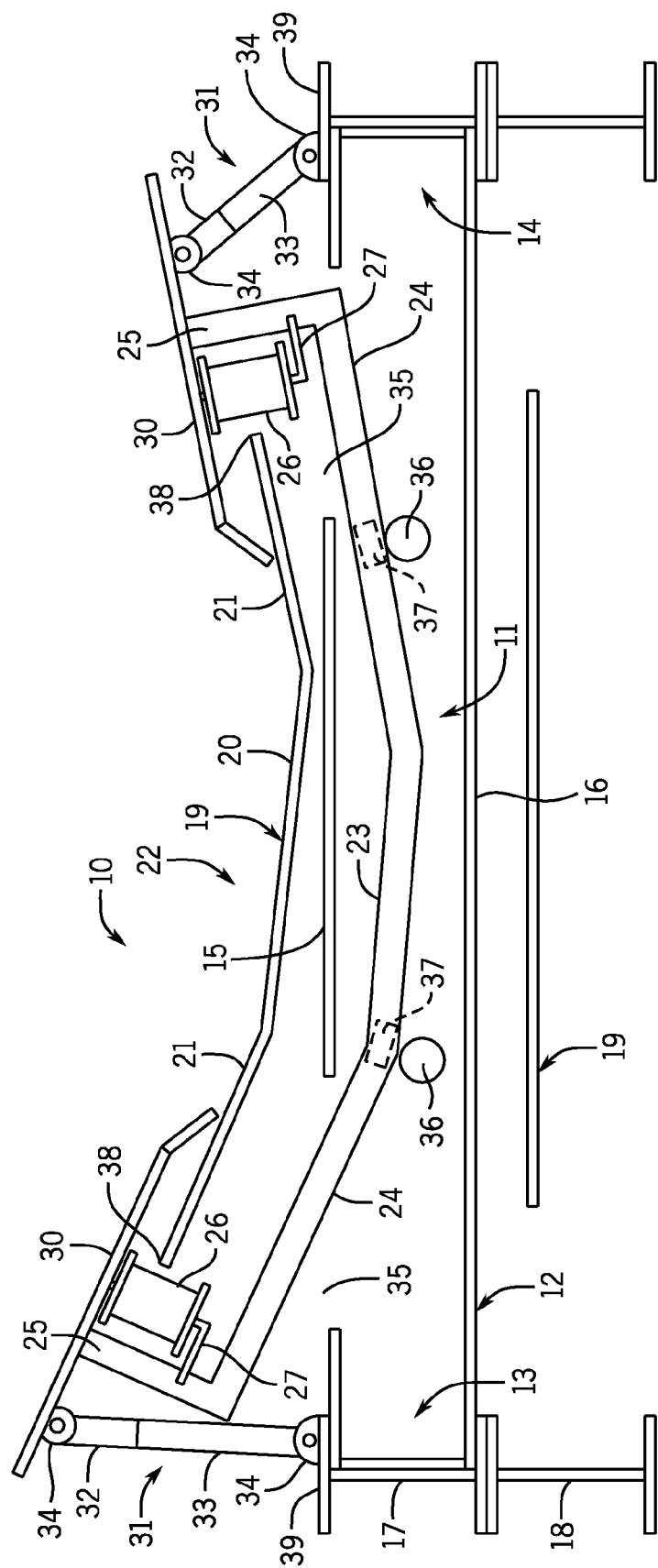
FIG. 2 illustrates a conveyor belt shifted to the left engaging the left conveyor belt side roller.

FIG. 2 illustrates the conveyor belt 19 shifted to the left. When the left edge 38 of the conveyor belt 19 pushes against the left conveyor belt side roller 26 the left side member 24 of the carriage 11 is forced to move upward and to the left along the left vertical bearing 36. The right side member 24 is forced to move downward and to the left along the right vertical bearing 36. The left and right carriage support arms 31 automatically adjust in length to accommodate the shifted position of the carriage 11. This rotational movement of the carriage 11 along bearings 36 causes the conveyor belt 19 to remain centered between the left and right rollers 26 and the left and right covering skirts 30. This causes any material loaded onto the conveyor belt 19 to move towards the center portion 20 of the conveyor belt 19.

Figure 3:
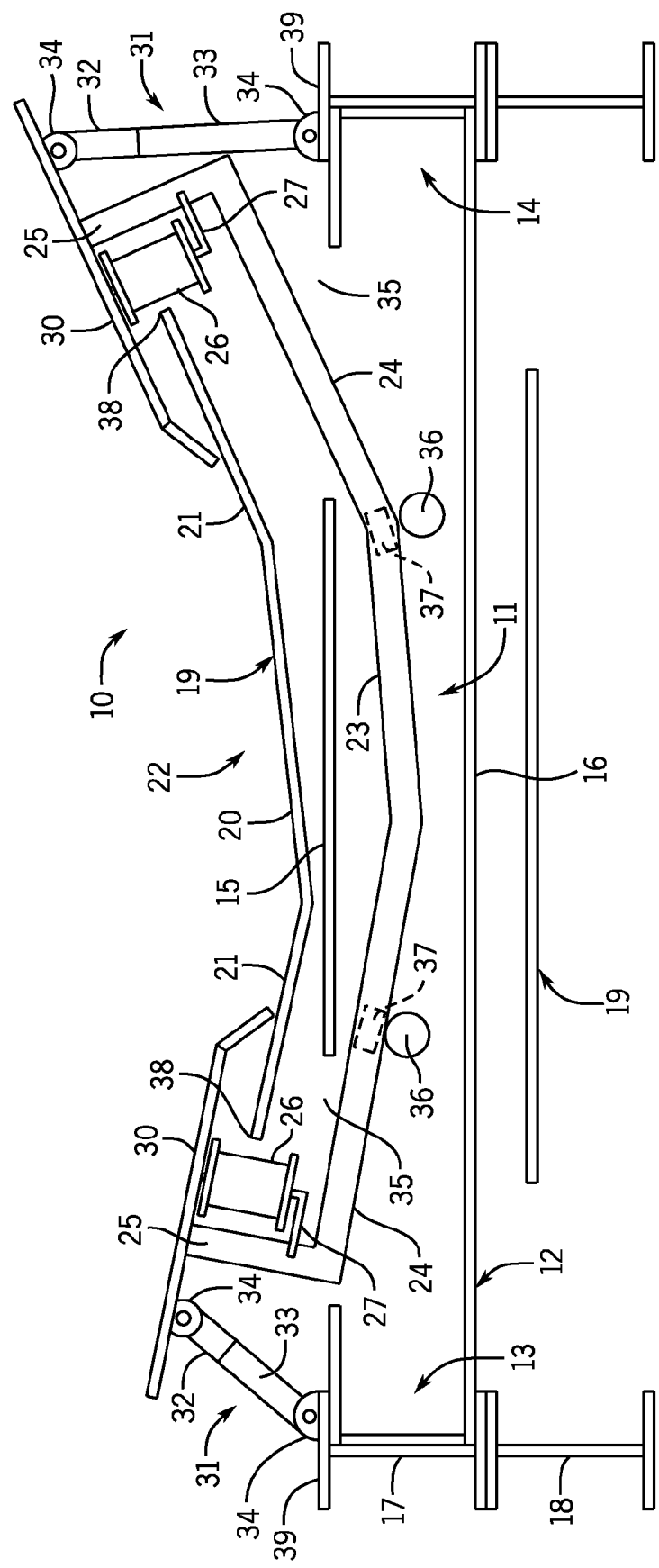
FIG. 3 illustrates a conveyor belt shifted to the right engaging the right conveyor belt side roller.

FIG. 3 illustrates the conveyor belt 19 shifted to the right. When the right edge 38 of the conveyor belt 19 pushes against the right conveyor belt side roller 26 the right side member 24 of the carriage 11 is forced to move upward and to the right along the right vertical bearing 36. The left side member 24 is forced to move downward and to the right along the left vertical bearing 36. The left and right carriage support arms 31 automatically adjust in length to accommodate the shifted position of the carriage 11. As noted above, this rotational curvilinear movement of the carriage 11 along bearings 36 causes the conveyor belt 19 to remain centered between the left and right rollers 26 and the left and right covering skirts 30. This causes any material loaded onto the conveyor belt 19 to move towards the center portion 20 of the conveyor belt 19.

FIGS. 2 and 3 illustrate that the side rollers 26 are rotatably mounted on the carriage 11 that also mounts the covering skirts 30. The carriage 11 is mounted on vertical bearings 36 that permit lateral and curvilinear movement of the carriage 11 relative to the belt conveyor main frame 17, wherein the carriage 11 and covering skirts 30 follow the trough angle of the conveyor belt 19 as the conveyor belt 19 shifts. Consequently, as a belt loading mechanism discharges material from a fixed point onto the conveyor belt 19, any shifting of the conveyor belt 19 will be tracked by the movable covering skirts 30 so that the material is deflected by the covering skirts 30 to the center portion 20 of conveyor belt 19. The material is, thus, always loaded on a center portion 20 of the conveyor belt 19. Accordingly, the material to be loaded would not be discharged on the conveyor belt 19 at an off-center location which would cause spillage throughout the length of the conveyor belt 19. This tracking action by the movable covering skirts 30 prevents costly clean-up problems, damage to the conveyor belt, and motor failure.

Figure 4:
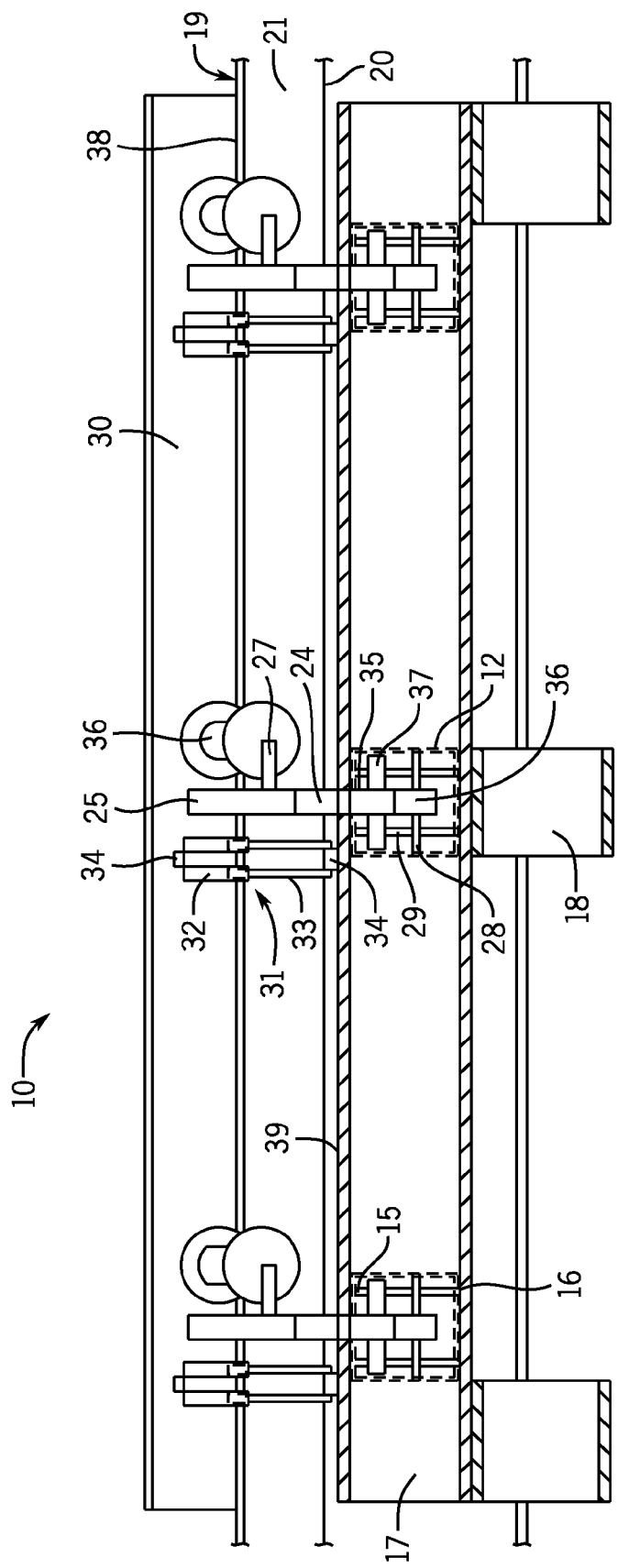
FIG. 4 shows a side view of the center loading assembly.

FIG. 4 shows a side view of the center loading assembly 10. The conveyor belt 19 is circular and is driven continuously by drive pulleys over idler troughing rollers (not shown) by methods well known in the art. FIG. 4 shows a pair of carriage support arms 31 for each carriage 11. Two side bearings 37 are shown positioning side member 24 on vertical bearing 36. The two side bearings 37 prevent the side members from coming off of the vertical bearing 36 as the carriage 11 rocks back and forth by the action of the conveyor belt 19 engaging side rollers 26 as it shifts from side to side. The vertical bearing shaft 28 attaches the vertical bearing 36 to the carriage support 12. The side bearing shaft 29 attaches the side bearings 37 to the carriage support 12.

Figure 5:
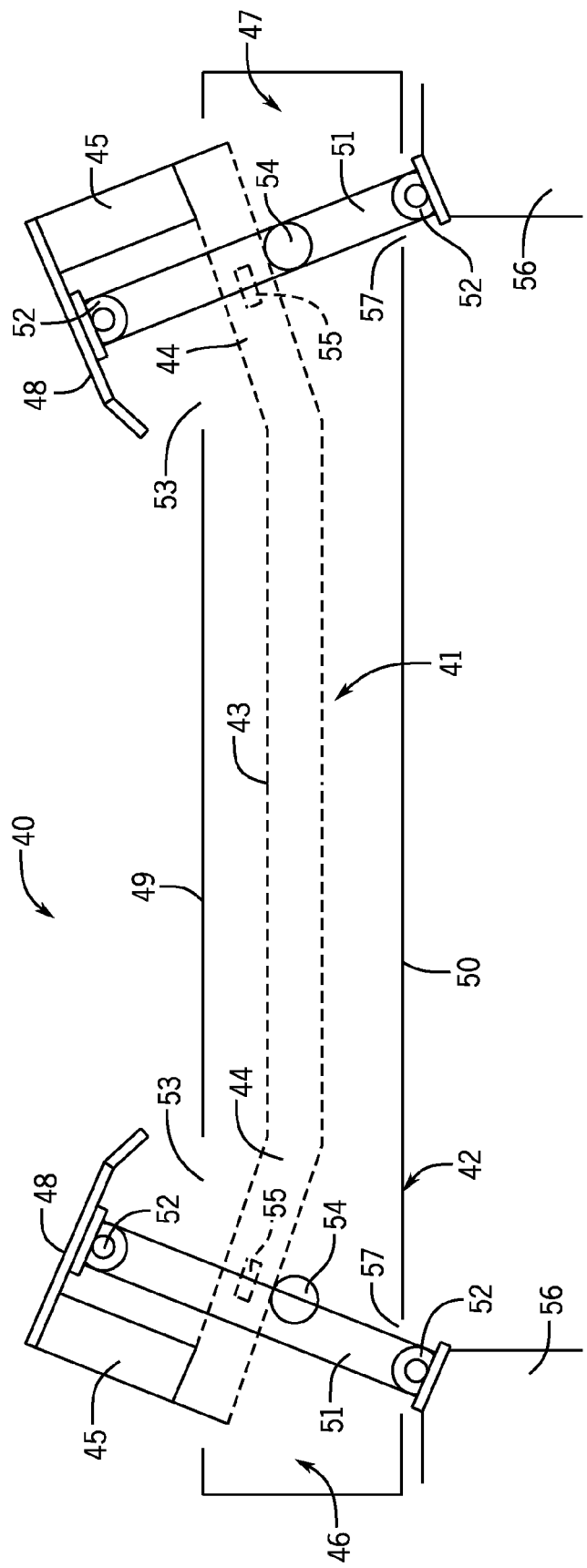
FIG. 5 shows an alternate embodiment of the center loading assembly.

FIG. 5 shows an alternate embodiment of the center loading assembly 10, which has a carriage 41 and a carriage support 42. The carriage support 42 has a left side 46, a right side 47, a top 49, and a bottom 50. The carriage 41 is made of a frame having a center member 43 and side members 44 extending from the center member 43. The side members 44 are angled upward from the center member 43. The side members 44 extend upward and out of the carriage support 42 through slots 53 in the top 49 of carriage support 42. Each end of the side members 44 has an upward extension 45 which also extends out of the carriage support through slots 53. The extensions 45 have a conveyor belt covering skirt 48 attached thereto at their free ends. Conveyor belt side rollers (not shown, but similar to those in FIGS. 1-3) are attached to the upward extensions 45 and to the conveyor belt covering skirts 48. Edges of a conveyor belt will engage the rollers if the conveyor belt shifts left or right from center. A carriage support arm 51 is attached rotatably by connectors 52 to each conveyor belt covering skirt 48. They are also attached rotatably to the main frame 56 of a belt conveyor, below the bottom 50 of the carriage support 42. The carriage support arms 51 may be automatically adjustable in length. Vertical bearings 54 and side bearings 55 are attached to the carriage support 42. The left and right side members 44 ride on vertical bearings 54 and are held in place by side bearings 55.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, the center loading assembly can be adapted to any type of belt conveyor system. Any type of variable length support rods known in the art can be used as pivoting carriage support arms. Any suitable type of side roller can be used. The components of the invention may be made of metal or plastic or combinations thereof.

It will be understood that various changes in the details, materials, and arrangements of the parts which have been described and illustrated above in order to explain the nature of this invention may be made by those skilled in the art without departing from the principle and scope of the invention as recited in the following claims.

I claim:

1. A center loading assembly for a conveyor belt, comprising:
   a) a carriage support having a left side, a right side, a top, and a bottom, said carriage support being attached to a belt conveyor main frame;
   b) a carriage within said carriage support, said carriage having a center member with side members extending therefrom, each end of said side members having an upward extension, one near said left side and the other near said right side;
   c) said upward extensions having side rollers and conveyor belt covering skirts attached thereto;
   d) said carriage support having vertical bearings attached thereto to support said carriage as said carriage moves from said left side to said right side and vice versa;
   e) said carriage support having openings in said top through which said upward extensions extend; and
   f) pivoting carriage support arms attached to said conveyor belt covering skirt and to said belt conveyor main frame at a position on said main frame being at or above said top of said carriage support, or attached to said conveyor belt covering skirt and to said top of said carriage support.

2. The center loading assembly of claim 1 further comprising said carriage support having side bearings attached thereto to hold said carriage in position on said vertical bearings.

3. The center loading assembly of claim 2 further comprising pivoting carriage support arms that are automatically adjustable in length.

4. The center loading assembly of claim 3 wherein said side members are angled upwards from said center member towards said top of said support carriage.

5. The center loading assembly of claim 4 wherein, when said conveyor belt shifts to said left side said conveyor belt engages said side roller near said left side and moves said carriage to said left side, and when said conveyor belt shifts to said right side said conveyor belt engages said side roller near said right side and moves said carriage to said right side, so that said conveyor belt always remains centered between said conveyor belt covering skirts as said conveyor belt moves from said right side to said left side and vice versa.

6. The center loading assembly of claim 5 wherein said carriage and said conveyor belt covering skirts follow a trough angle of said conveyor belt as said conveyor belt shifts.

7. The center loading assembly of claim 6 wherein, when material is deposited from a fixed discharge position spaced above a center portion of said conveyor belt, said material will be deposited onto said center portion by said material being deflected to said center portion by said conveyor belt covering skirts.

8. A center loading assembly for a conveyor belt, comprising:
   a) a carriage support having a left side, a right side, a top, and a bottom, said carriage support being attached to a belt conveyor main frame;
   b) a carriage within said carriage support, said carriage having a center member with side members extending therefrom, each end of said side members having an upward extension, one near said left side and the other near said right side, wherein said side members are angled upwards from said center member towards said top of said support carriage;
   c) said upward extensions having side rollers and conveyor belt covering skirts attached thereto;
   d) said carriage support having vertical bearings attached thereto to support said carriage as said carriage moves from said left side to said right side and vice versa and having side bearings attached thereto to hold said carriage in position on said vertical bearings;
   e) said carriage support having openings in said top through which said upward extensions extend; and
   f) pivoting carriage support arms attached to said conveyor belt covering skirt and to said belt conveyor main frame at a position on said main frame being at or above said top of said carriage support, or attached to said conveyor belt covering skirt and to said top of said carriage support, wherein said pivoting support arms are automatically adjustable in length.

9. The center loading assembly of claim 8 wherein, when said conveyor belt shifts to said left side said conveyor belt engages said side roller near said left side and moves said carriage to said left side, and when said conveyor belt shifts to said right side said conveyor belt engages said side roller near said right side and moves said carriage to said right side, so that said conveyor belt always remains centered between said conveyor belt covering skirts as said conveyor belt moves from said right side to said left side and vice versa.

10. The center loading assembly of claim 9 wherein said carriage and said conveyor belt covering skirts follow a trough angle of said conveyor belt as said conveyor belt shifts.

11. A center loading assembly for a conveyor belt, comprising:
    a) a carriage support having a left side, a right side, a top, and a bottom, said carriage support being attached to a belt conveyor main frame;
    b) a carriage within said carriage support, said carriage having a center member with side members extending therefrom, each end of said side members having an upward extension, one near said left side and the other near said right side;
    c) said upward extensions having side rollers and conveyor belt covering skirts attached thereto;
    d) said carriage support having openings in said top through which said upward extensions extend and openings in said bottom through which pivoting carriage support arms extend; and
    e) said pivoting carriage support arms being attached to said conveyor belt covering skirt and to said belt conveyor main frame at a position on said main frame being at or below said bottom of said carriage support.

12. The center loading assembly of claim 11 further comprising said carriage support having vertical bearings attached thereto to support said carriage as said carriage moves from said left side to said right side and vice versa.

13. The center loading assembly of claim 12 further comprising said carriage support having side bearings attached thereto to hold said carriage in position on said vertical bearings.

14. The center loading assembly of claim 13 further comprising pivoting carriage support arms that are automatically adjustable in length.

15. The center loading assembly of claim 14 wherein said side members are angled upwards from said center member towards said top of said support carriage.

16. The center loading assembly of claim 15 wherein, when said conveyor belt shifts to said left side said conveyor belt engages said side roller near said left side and moves said carriage to said left side, and when said conveyor belt shifts to said right side said conveyor belt engages said side roller near said right side and moves said carriage to said right side, so that said conveyor belt always remains centered between said conveyor belt covering skirts as said conveyor belt moves from said right side to said left side and vice versa.

17. The center loading assembly of claim 16 wherein said carriage and said conveyor belt covering skirts follow a trough angle of said conveyor belt as said conveyor belt shifts.

18. The center loading assembly of claim 17 wherein, when material is deposited from a fixed discharge position spaced above a center portion of said conveyor belt, said material will be deposited onto said center portion by said material being deflected to said center portion by said conveyor belt covering skirts.

19. A center loading assembly for a conveyor belt, comprising:
   a) a carriage support having a left side, a right side, a top, and a bottom, said carriage support being attached to a belt conveyor main frame;
   b) a carriage within said carriage support, said carriage having a center member with side members extending therefrom, each end of said side members have an upward extension, one near said left side and the other near said right side;
   c) said upward extensions having side rollers and conveyor belt covering skirts attached thereto;
   d) said carriage support having openings in said top through which said upward extensions extend and openings in said bottom through which pivoting carriage support arms extend;
   e) said pivoting carriage support arms being attached to said conveyor belt covering skirt and to said belt conveyor main frame at a position on said main frame being at or below said bottom of said carriage support, wherein said pivoting carriage support arms are automatically adjustable in length; and
   f) said carriage support having vertical bearings attached thereto to support said carriage as said carriage moves from said left side to said right side and vice versa and said carriage support having side bearings attached thereto to hold said carriage in position on said vertical bearings.

20. The center loading assembly of claim 19 wherein, when said conveyor belt shifts to said left side said conveyor belt engages said side roller near said left side and moves said carriage to said left side, and when said conveyor belt shifts to said right side said conveyor belt engages said side roller near said right side and moves said carriage to said right side, so that said conveyor belt always remains centered between said conveyor belt covering skirts as said conveyor belt moves from said right side to said left side and vice versa.

21. The center loading assembly of claim 20 wherein said carriage and said conveyor belt covering skirts follow a trough angle of said conveyor belt as said conveyor belt shifts.

* * * * *